(12) United States Patent
Adolfsson

(10) Patent No.: US 7,757,599 B2
(45) Date of Patent: Jul. 20, 2010

(54) SEALING ARRANGEMENT FOR RELATIVELY MOVABLE PARTS AND DEVICE INCLUDING SUCH A SEALING ARRANGEMENT

(75) Inventor: Bengt Adolfsson, Stockholm (SE)

(73) Assignee: Dynaseal Technologies AB, Solna (SE)

( * ) Notice: Subject to any disclaimer, the term of this patent is extended or adjusted under 35 U.S.C. 154(b) by 519 days.

(21) Appl. No.: 10/590,665

(22) PCT Filed: Feb. 25, 2005

(86) PCT No.: PCT/SE2005/000279

§ 371 (c)(1),
(2), (4) Date: Aug. 25, 2006

(87) PCT Pub. No.: WO2005/080836

PCT Pub. Date: Sep. 1, 2005

(65) Prior Publication Data

US 2007/0193443 A1    Aug. 23, 2007

(30) Foreign Application Priority Data

Feb. 25, 2004    (SE) .................................... 0400442

(51) Int. Cl.
*F01B 31/00*    (2006.01)
*F16J 9/00*    (2006.01)
(52) U.S. Cl. .......................................... 92/86.5; 92/249
(58) Field of Classification Search .............. 92/86.5, 92/182, 183, 248, 249; 277/447, 422
See application file for complete search history.

(56) References Cited

U.S. PATENT DOCUMENTS

| 3,462,159 | A | * | 8/1969  | Baumann et al. ............. 277/422 |
| 3,943,717 | A |   | 3/1976  | Schexnayder ................. 60/453 |
| 4,055,107 | A | * | 10/1977 | Bartley ........................ 92/86.5 |
| 4,168,936 | A |   | 9/1979  | Scheller et al. ............. 415/170 |
| 4,672,921 | A |   | 6/1987  | Quaglino, Jr. ................. 123/41 |
| 5,701,797 | A |   | 12/1997 | Mohn ............................. 92/80 |

FOREIGN PATENT DOCUMENTS

FR       1543409           9/1967
WO       WO 03038320 A1 *  5/2003

* cited by examiner

*Primary Examiner*—Michael Leslie
(74) *Attorney, Agent, or Firm*—Jacobson Holman PLLC

(57) ABSTRACT

A sealing arrangement for two relatively movable first and second parts and including a sealing ring positioned in a groove on one of the parts for sealing contact against the other one of the parts, so as to separate a first side of the sealing ring from a second side of the sealing ring, wherein the sealing ring is positioned in a sealing ring seat formed as a groove in the circumference of one of the parts, including liquid supply means for supplying liquid under pressure to the second side of the sealing ring, and means for balancing the pressure of the supplied liquid in the region of the sealing ring, whereby forces on the sealing ring resulting from the pressure prevailing on the first side of the sealing ring are counteracted and balanced in such a way that in operation the sealing ring is essentially free-floating in the groove. The invention also concerns a reciprocating piston device including such a sealing arrangement.

26 Claims, 3 Drawing Sheets

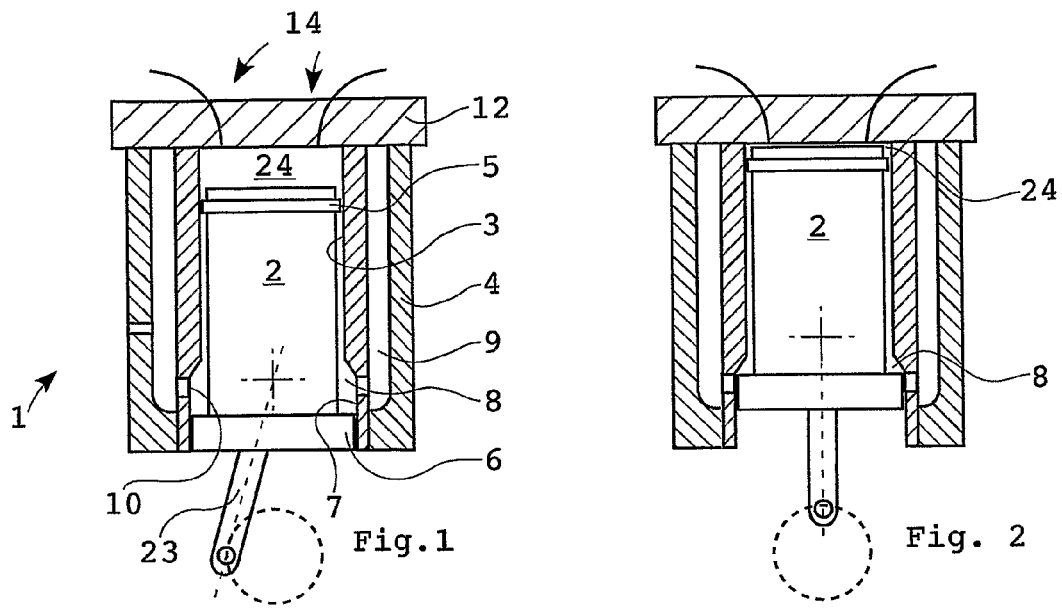
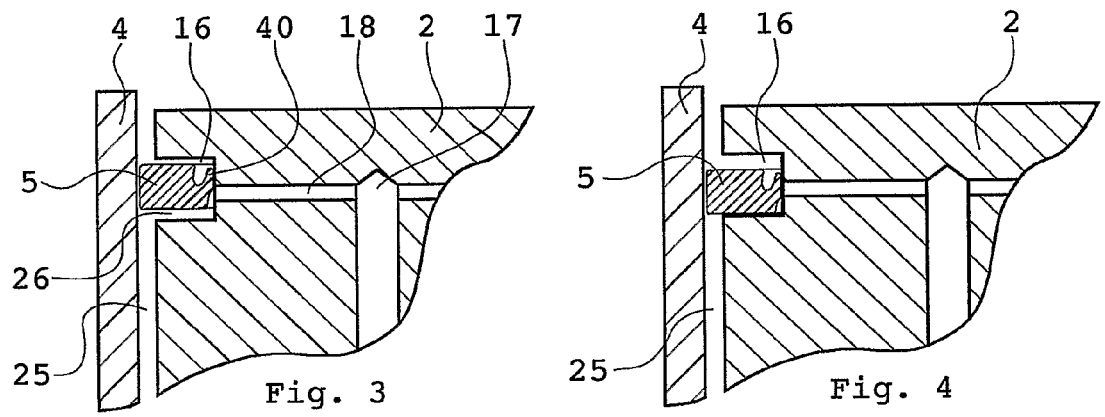
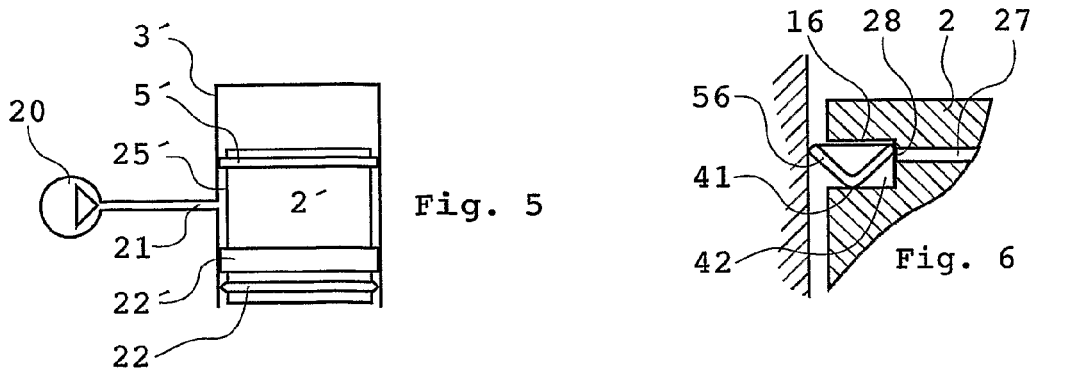
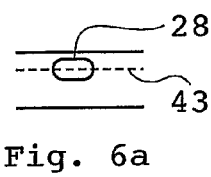
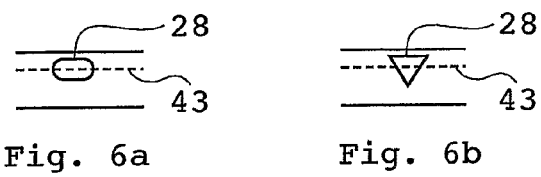
Fig. 1  Fig. 2  Fig. 3  Fig. 4  Fig. 5  Fig. 6  Fig. 6a  Fig. 6b

SEALING ARRANGEMENT FOR RELATIVELY MOVABLE PARTS AND DEVICE INCLUDING SUCH A SEALING ARRANGEMENT

This is a nationalization of PCT/SE2005/000279 filed 25 Feb. 2005 and published in English.

FIELD OF THE INVENTION

This invention relates to a sealing arrangement. It also relates to a device having relatively movable parts including such a sealing arrangement.

BACKGROUND OF THE INVENTION

In this specification and in the annexed claims "relatively movable parts" relates to devices having parts that are relatively movable through relative linear or relative rotational movement or a combination thereof. "Reciprocating piston device" includes compressors and other pressurizing devices as well as engines having relatively movable piston and cylinder irrespective which element is stationary and which element is movable.

In previously known devices having relatively movable parts, and in particular reciprocating piston devices such as piston compressors, normally a sealing arrangement is provided wherein at least one sealing ring is positioned in a circumferential groove at the outside of the piston or in the cylinder in order to provide a seal between the movable piston and the cylinder wall. In particular in respect of piston compressors working with moderate or high pressure the working life of the sealing arrangement before exchange or service is highly dependent on wear of the seal ring as well as wear of the meeting surface of the cylinder wall or rod. This is particularly noticeable in oil-free compressors.

Excessive wear of the sealing ring and subsequent failure of the sealing arrangement results in need for replacement and/or service. As a consequence, this leads to a period of downtime of a device including the sealing arrangement such as a compressor together with related machines during the replacement time. Altogether this results in increased costs and discontinued production or operation. The corresponding problems occur in other reciprocating piston devices and shafts as intended in this specification.

As an example of background art, FR-1 543 403 may be mentioned. Herein pressure acting on the inside of a number of piston rings is limited by means of a valve arrangement.

In sealing arrangements for relatively rotational members such as e.g. rotary shaft sealing arrangements corresponding problems occur, in particular the problems are important if there is a great pressure difference between the sides of the sealing arrangement.

AIM AND MOST IMPORTANT FEATURES OF THE INVENTION

It is an aim of this invention to provide a sealing arrangement according to the above which is an improvement of previously known sealing arrangements. In particular it is an aim to increase the working life of the sealing ring in order to avoid the drawbacks mentioned above.

It is also an aim of the invention to provide a reciprocating piston device that includes a sealing arrangement having an extended working life.

These aims are achieved according to the invention through the features of the characterizing portions of the independent claims.

This way the forces acting on the sealing ring resulting from pressure on the one side of the sealing ring are counteracted by the supplied liquid providing a balancing force on the other side of the seal. Hereby axial and radial forces as well as twisting and wringing of the sealing ring, are avoided or at least reduced. The pressure provided by the sealing ring against the moving opposing surface can essentially be reduced as far as to the preset pressure built-in into the seal.

In previously known devices having relatively movable parts such as piston compressors, these forces tend to press the sealing ring, normally a piston ring, against the meeting surface, normally the cylinder wall, thereby inducing wear of the piston ring as well as of the cylinder wall surface. As a contrast, according to the invention this wear is decreased to a great extent.

The balancing means may include the sealing ring itself or be separate from the sealing ring, for example as a separate valve device. In particular the balancing means is a dynamic balancing means that dynamically balances the pressure of the supplied liquid to match that of the opposite side of the sealing ring continuously during the stroke/operation of a device where it is applied. In particular also, the sealing ring is not fixed but instead positioned with play inside the sealing ring groove so as to allow a certain movement of the ring therein to achieve the essentially floating state.

When the valve device is preset to balance the pressure of the liquid, this can be so as to obtain a desired relation between the pressures prevailing on the two sides. In particular it is useful that the valve device is set to limit the pressure to about 80-100% of the pressure inside the pressure chamber. Other ranges may come into question, from e.g. 50% and up to even a certain over-pressure such as e.g. 110%, even if that is not normally advantageous.

In case of a sealing arrangement wherein, during operation, a flow of the supplied liquid passes the sealing ring, the sealing ring is more or less floating on a flow of liquid, whereby little or no friction will exist between the sealing ring and the sealing ring groove; The sealing ring can thereby move more independently of the groove, without any mentionable friction. Thereby also the load on the sealing ring normally resulting from a moving & tilting piston can be reduced. Otherwise, when the piston moves/tilts sideways, the friction between the sealing ring in the sealing ring groove at the low pressure side, forces the seal against the moving cylinder surface as the piston tilts.

The pressure on the sealing ring against the moving surface combined with the traveled distance and, in most cases, also temperature are to be considered when calculating the lifetime of a sealing ring.

In general in reciprocating piston devices forming the background art, the pressure differential between the high pressure side and the low pressure side does not only force the sealing ring against the moving radial surface, but also against the bottom of the groove at the low pressure side. The radial pressure of the sealing ring against the moving surface increases with increasing pressure and thus causes a pulsating pressure load on the sealing ring over the piston cycle. This radial pressure is normally approximately the average of the difference pressure between the high pressure and the low pressure values multiplied with the radial surface area.

Further, due to necessary clearance between piston and cylinder wall, the axially support from the low pressure side does not cover the whole sealing ring which thereby will twist with the pulsating pressure. This results in a varying contact angle between the sealing ring and the moving opposite surface, varying the contact surface between the sealing ring and the opposite wall and the thus load per surface unit.

Increased wear is not only the result of increased friction, but also indirectly a result of increased temperature caused by the friction and often the raised temperature in the pumped media. This changes the wear characteristics of the material in the seal and is particularly important in cases of synthetic seals. Further, according to the aspect of the invention where there is arranged for a liquid flow passing the sealing ring, the temperature is controlled by the liquid flow in the region of the sealing arrangement.

The invention is advantageous by eliminating or at least reducing: Pressure differential over the sealing ring; Twisting of the sealing ring; Friction between the sealing ring and the sealing ring groove; Sealing ring temperature.

The liquid supply can be provided either from an internal or from an external source.

In an exemplary embodiment, in a pump or a compressor, the liquid supply device is integral with the reciprocating piston device in that it includes an enlarged piston portion in co-operation with an enlarged cylinder portion in a position axially at a greater distance from the pressure chamber than the position of the piston seal. This embodiment provides a compact solution creating a simultaneously matching pressure on both sides of the seal over the stroke, with simplified channeling arrangements.

In motor applications, the relief of the ring is desired on the down stroke. The cylinder and the piston is in that case without enlarged portions.

Inclusion of an external pump for liquid supply, on the other hand, makes it possible to improve liquid supply operation after need and desire. No or at least reduced pulsation will be achieved.

A simple way of controlling the flow of the liquid is by means of the sealing ring itself. In case of an integral liquid supply and outflow through the sealing ring groove, increased flow due to increased piston speed-over the pumping stroke, will press the sealing ring higher up in the groove so as to open up successively larger outlet areas. Thus the sealing ring will float on the flow of liquid being pumped under it and simultaneously match the pressure from the pressurizing chamber.

The inclusion of a pressure control valve device for the supplied liquid makes it possible to fine tune and control the liquid pressure and/or the liquid flow as desired. Further, the design of a separate pressure balancing valve may simplify the design of the seal and enable a low flow rate and thereby avoid possible cavitations problems emanating from a high liquid flow immediately under the seal.

Such a valve may be positioned in the piston but may as well be positioned in an outlet channel or channels which start (s) in the cylinder wall.

More features and advantages of the invention will come clear from the following description of embodiments.

BRIEF DESCRIPTION OF DRAWINGS

The invention will now be described at the background of exemplary embodiments and with reference to the drawings, wherein:

FIG. 1 shows, in an axial section, an exemplary embodiment of a compressor as the reciprocating piston device according to the invention with the piston in a first position, FIG. 2 shows the embodiment in FIG. 1 with the piston in a second position, FIG. 3 shows an enlarged partial sectional view of the region of the piston seal in FIGS. 1 and 2 in an upper position, FIG. 4 shows the region of FIG. 3 in a lower position, FIG. 5 shows diagrammatically a second exemplary embodiment of a reciprocating piston device according to the invention, FIG. 6 shows a second example of a piston ring configuration, FIGS. 6a and b show alternative details of the embodiment of FIG. 6.

DESCRIPTION OF EMBODIMENTS

Figure 7:
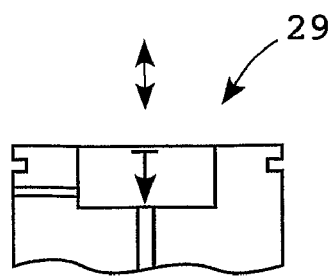
FIG. 7 shows a further exemplary aspect of the invention.

In FIG. 1 is shown a reciprocating piston device in the form of a piston compressor 1 having a piston 2, a piston rod 23 and a cylinder 4. The piston 2, is reciprocally movable inside a cylinder wall 3, which is defined by a cylinder 4, having a cylinder head 12, wherein the usual valve arrangements are provided (not shown here but indicated at 14).

Also other kinds of per se known reciprocating piston devices, such as having an integral piston and piston rod and a wobbling cylinder are of course within the scope of the invention.

The piston 2 carries a sealing ring in the form of a piston ring 5 near its top. Further, there is an enlarged portion 6 on the piston, said enlarged portion 6, being positioned axially at a greater distance than the piston ring 5, from the pressure chamber which in this case is a compression chamber 24, formed by the cylinder 3 and the cylinder head 12.

The enlarged portion 6 of the piston co-operates with an enlarged portion 7 of the cylinder, so that they together form a working chamber 8 which in operation works as a liquid pump for increasing the pressure of the medium being present in the working chamber 8 and in the slot 25 (FIG. 3) formed between the piston and cylinder, and in particular below the piston ring 5. The need of an external circulation pump can be eliminated because the cooling of the region of the sealing arrangement is accomplished through the invention.

Outside the cylinder lining 4 but inside a cylinder housing there is provided a cooling and liquid supply chamber 9 which communicates with the working chamber 8 over at least one liquid orifice 10 so that the cooling medium intended to flow outside the cylinder lining is also the medium in the space 8. Flow of liquid into the chamber 9 is conducted over a non return valve in order not to maintain a desired pressure in the working chamber 8 when the device is in operation. Preferably there is a certain overpressure in the liquid entering the working chamber over orifice 10. (This is also the case in the embodiment shown in FIG. 9, wherein a certain pressure should prevail in the inlet 10).

FIG. 2 shows the piston 2 when it has reached its top position with a minimal compression chamber space 24 and a minimal working chamber 8 for the enlarged portions of the cylinder and the piston.

It should be noted that the dimensions of the working chamber 8 have been exaggerated for clarity reasons. In practice the working space needs to be considerably smaller. As an example, in a compressor for carbon dioxide and water as balancing medium, the volume of the working chamber 8 needs to be only from about one to a few % (about 1-4%) of the volume of the compression chamber. It is, however not excluded that in certain applications the working chamber 8 needs to be bigger in relation to the compression chamber.

In FIG. 3 the region of the piston ring in FIGS. 1 and 2 is shown in more detail. This position is an upwardly moving position of the piston inside the cylinder. Because of the liquid pressure created in the working chamber 8 and prevailing in the ring shaped slot 25 between the piston and the cylinder, a flow of liquid will be formed in a radial slot 26, between the bottom side the piston ring 5 and the bottom surface of the piston ring groove 16. Hereby the piston ring will float on the liquid in said radial slot 26 under these circumstances. In this position the pressure in the slot 25 is equivalent to that of the compression chamber 24. In order to provide for the pressure in the slot to enter into the radial slot 26, shallow radial grooves or the like may be arranged in one of the meeting surfaces of the ring an the bottom surface of the piston ring groove.

The liquid will subsequently pass into the inside of the piston 2 over an outlet channel 17, 18 being comprised, in this exemplary embodiment, of a number of radial bores 18 and an axial bore 17. Liquid is then transmitted, possibly in a closed circuit, away from the piston through means that are not shown here.

As can be understood from this figure, cooling of the region of the sealing ring 5 is enhanced because of the passing liquid flow. This feature of the invention results in further extended working life of the device, since overheating of the components is avoided.

40 indicates a sealing lip extending inwardly from the ring 5 and sealing the compression chamber from being evacuated over the outlet channel 17, 18. An O-ring in this position could serve the same purpose.

In FIG. 4 the piston is shown in a position where the piston ring 5 with its bottom side abuts the bottom surface of the groove 16 so as to restrict and in some cases prevent liquid from flowing through the path indicated in and described in connection with FIG. 3. In this position, the pressure in the compression chamber exceeds that in the slot 25.

Normally, during the downward, suction, stroke of the piston, the pressure in the slot 25 will be lower than that of the compression chamber 24. The piston seal 5, will also work as a check valve for the liquid pumping function of the liquid working chamber 8 in FIG. 1. The contrary is true with respect of motor applications.

In FIG. 5 the integral liquid supply device has been replaced with an external pressure liquid source 20, which communicates with the cylinder 3, over a channel 21, which in turn debouches at a position below the piston ring 5, which per se works similar to the piston ring shown in FIGS. 3 and 4, so as to provide balancing liquid pressure. This enables a constant liquid flow without pulsation. In the embodiment, a further double sealing device 22, 22', is provided at the bottom part of the piston, so as to move with the piston, so that an annular slot-shaped space 25, for increased pressure will be formed between the outside surface of the piston 2, the cylinder 3, the piston seal 5, and the sealing device 22, 22'.

Figure 9:
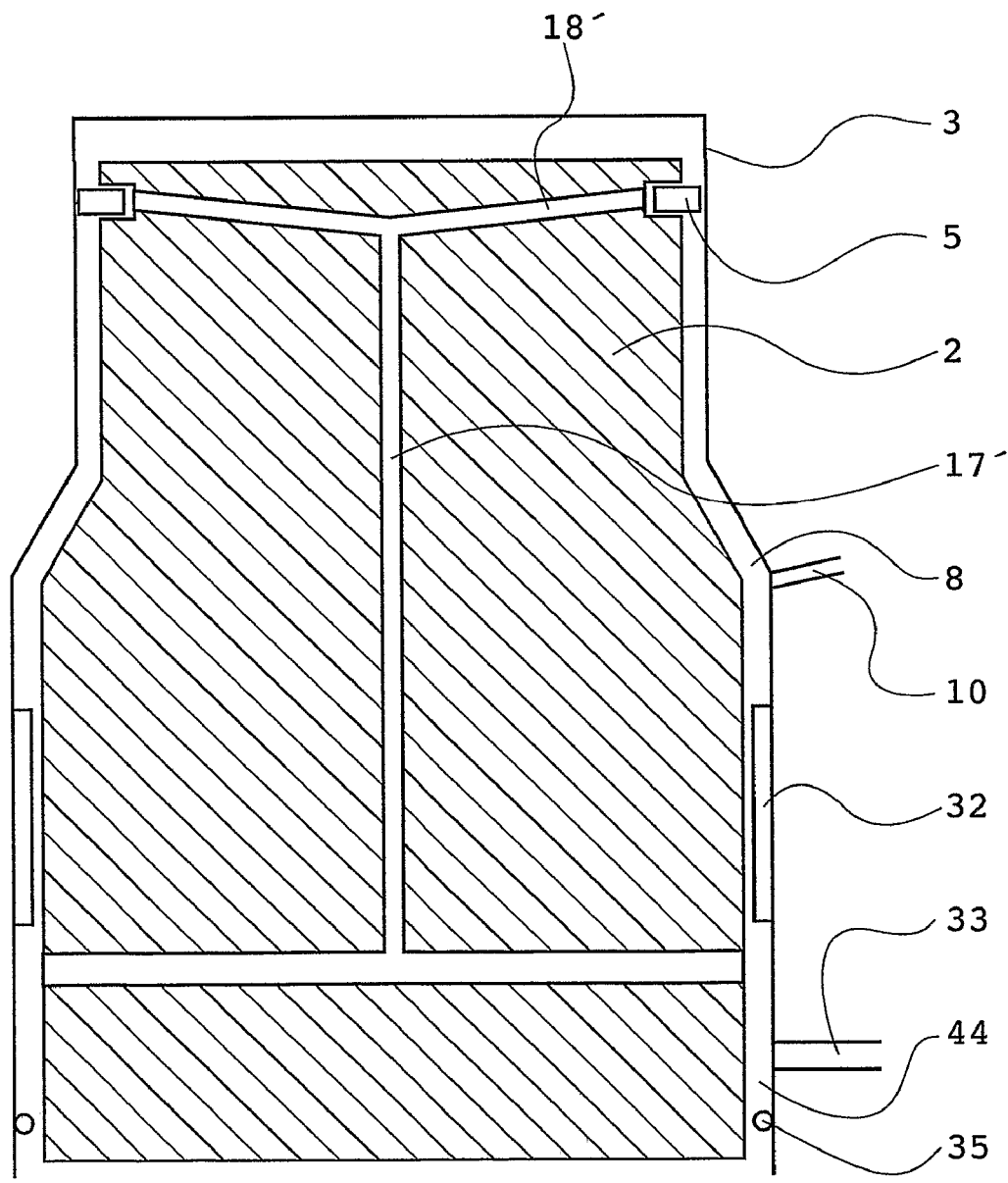
FIG. 9 shows an alternative embodiment of the invention.

The sealing device 22, 22' may be comprised of a simple sealing ring 22 or a plural of sealing rings 22 in combination with a slot sealing arrangement 22'. Such a slot-sealing arrangement may as an example be comprised of a sealing bushing portion of the piston, forming, together with a co-operating portion of the cylinder, a narrow slot having a width of as an example 15 μm. The sealing bushing also functions as a guide for the piston in operation of the compressor. If necessary, a liquid outlet as is shown in FIG. 9 could be arranged between the elements 22 and 22'. Many kinds of liquid pumps could be used as the external pump, for example: a gear type pump, a piston pump, an impeller pump, a screw pump etc.

FIG. 6 shows an alternative standard piston seal, having a shallow, essentially V-shaped section for use with the invention. This piston seal will, like most of the other seals, function as a valve, but with the difference that the radial inside edge of the ring 56, co-operates with openings 28, in the side of the groove 16, the opening areas of which increases with the distance from the bottom of the groove 16.

This embodiment like other embodiments has the advantage that liquid flow and floating effect can be fine-tuned in that the ring 26 will move axially with respect to the groove during the piston cycle, so as to allow escape for the proper amount of liquid during the different phases of the cycle. In general, in lower positions, the escape path is closed or restricted for liquid being supplied in a manner corresponding to the above embodiments. As the ring moves upwards in the groove 16, the channels 27, opens up gradually.

In order to ensure that liquid pressure prevails also in the space 42, inside the lower edge 41 of the "V", The edge 41 is preferably provided with radial grooves (not shown) for passage of liquid.

FIGS. 6a and b show alternative details of the embodiment of FIG. 6, wherein the sealing ring, acts as a valve device by its radial inwardly directed edge portion (indicated with interrupted lines and ref. sign 43) co-operating with the mouth 28 of an outlet channel. In the lowermost position the path is closed for liquid being supplied. In the uppermost position the path is entirely open.

Because of the forces on the piston ring being balanced, as an example, it may also be possible to use a sealing ring of the O-ring type. Care should, however be taken to position the outlet for the liquid below the center of the ring so as to avoid leakage between the two chambers for gas and liquid.

FIG. 7 shows an embodiment, wherein the pressure below the piston seal is coupled to the pressure inside the compression chamber over the valve device 29, allowing more freedom to chose the pressure and characteristics of the escape from below the piston seal. The amount of liquid leaking can however be restricted properly by tuning the valve device. For example the magnitude of the pressure in the liquid may be reduced so as to amount to only a minor part of the maximum compression pressure.

Figure 8:
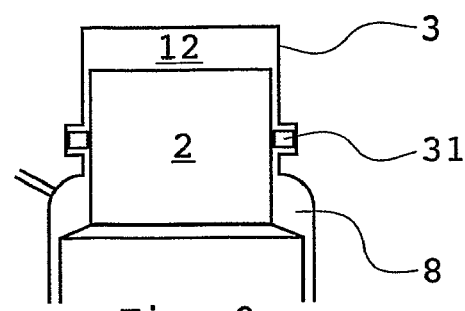
FIG. 8 shows a further embodiment of the invention.

The invention is also applicable to reciprocal piston devices having a sealing ring disposed in a groove in the cylinder wall and acting against a meeting wall being formed by a reciprocating co-operating piston. This is shown diagrammatically in FIG. 8 with a sealing ring in connection with an integral working chamber 8, analogous to what is shown in FIG. 1.

An important part of the invention is the arrangement for maintaining the pressure below the sealing ring without causing unnecessary leakage of the balancing medium.

In FIG. 9, liquid from the area of the piston ring 5, is conducted over channels 18', 17' and 34 to a space 44 formed below a guide/seal bushing 32, which in principle functions as the sealing/guiding bushing 22' in FIG. 5, and a lower, low pressure seal 35. Into the space 44, also enters liquid leaking from the chamber 8 over the seal bushing 32. 33 indicates a fluid outlet from the space 44 to a tank or a loop which in turn may be connected with the inlet 10 to the chamber 8. By having an evacuation area of the outlet 33 being larger than the sum of the valving area defined by the piston ring 5 inside its groove together with the leakage area defined by the slot-sealing arrangement over the bushing 32, unwanted pressure build-up in the space 44 is eliminated.

The space 44 is thus exposed to a considerably lower pressure than prevails in the pressure chamber 3. In the space 44 prevails normally between atmospheric pressure and 5 bar. In high pressure applications, a pump may be provided to maintain a low pressure in the space 44. In this way, the low pressure seal 35 is only exposed to low pressure differences and can therefore be of a simple design. Altogether the leakage from the device can be reduced to a minimum.

Figure 10:
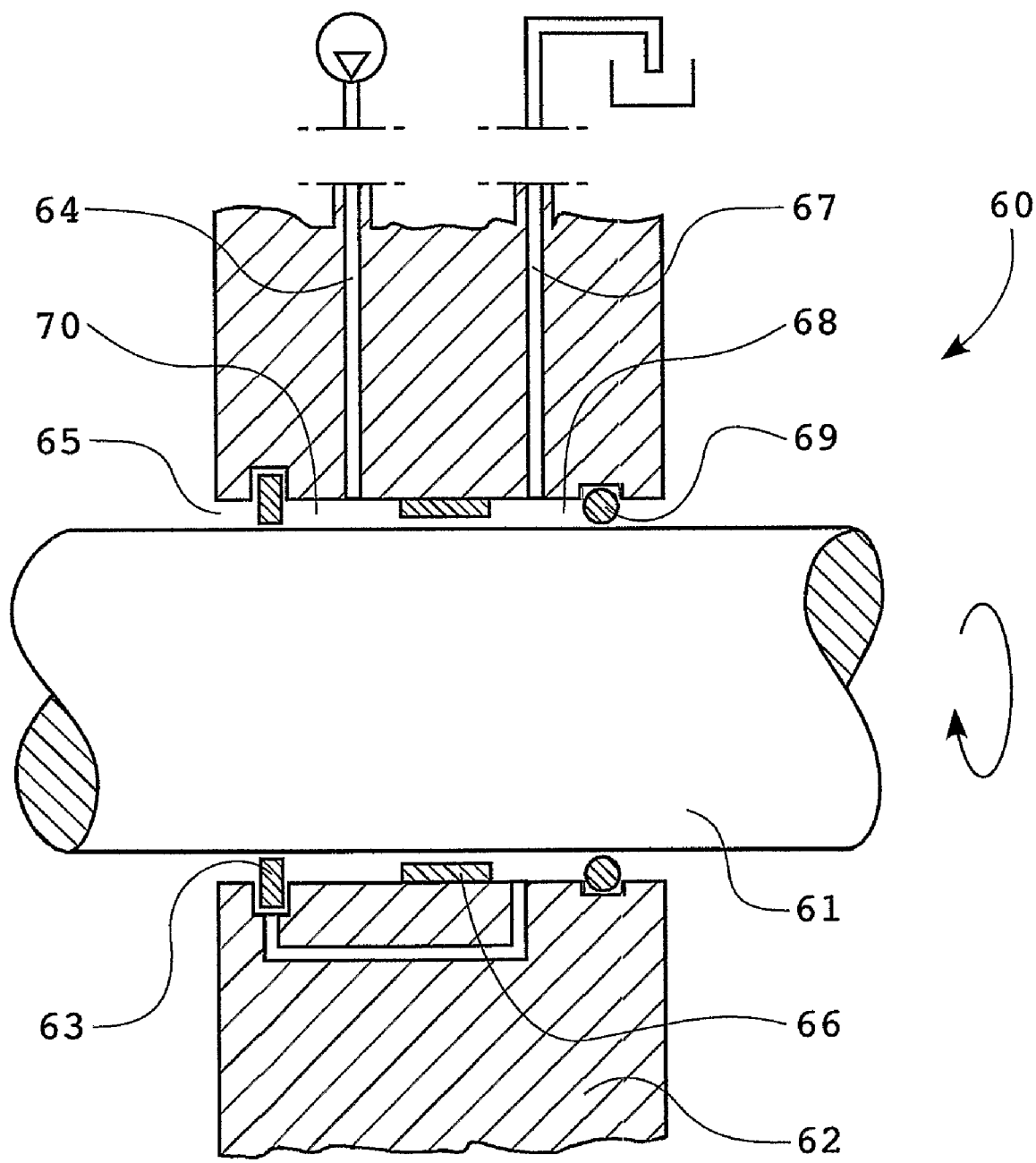
FIG. 10 shows the invention applied between two relatively rotatable parts.

Above, the invention has been described at the background of seals in general and piston rings in particular against a cylinder wall, but the invention is applicable to sealing arrangements for relatively movable parts in general such as also for relatively rotatable parts such as shaft sealing arrangements. Parts having a combination of rotation and reciprocation can also be sealed with a sealing arrangement according to the invention. In FIG. 10, a sealing arrangement 60 is shown for sealing between a first part which is a rotatable shaft 61 passing an opening in a housing 62 forming the second part. A separate bearing may also be included at this position. A floating and pressure balanced sealing ring 63 seals between a first side 65 and a second side 70. Liquid is supplied to said second side through the channel 64. A bushing 66 provides for slot sealing arrangement so that leakage in the direction to the right in the figure is restricted. Leaking liquid is allowed to escape from an intermediate space 68 where atmospheric pressure prevails through the channel 67 to tank so as to possibly be reused. A sealing element such as an O-ring 69 is provided outermost in the opening. The pressure in the space at the second side 70 can be regulated through a floating sealing ring (63) as in FIGS. 3 and 4 or by a valve equivalent to what as indicated in connection with FIG. 7.

Among other things, the invention makes it possible to provide lubricant-free compressors having a long lifetime, in particular for high pressure compressors in the area of 100 bar or more. The lifetime of the piston seal of a previously known compressor is dependent on compression pressure and traveled distance. The invention makes it possible to balance the pressure in such a way that the forces, with which the sealing ring is applied against the meeting wall as well as twisting and pulsating forces are reduced, whereby the lifetime of the sealing ring may be increased as well as the periods between maintenance and exchange.

This effect is enhanced through the continuous cooling of the piston and the sealing ring, which is provided through one aspect of the invention. Hereby it is enabled that the cylinder, the piston and the sealing ring maintains essentially equivalent temperatures. Possibly, at least in certain applications, there will be no need for outside cooling arrangements.

It is further possible to supply liquid through a rotating shaft or inside a reciprocating piston in order to ensure balancing of the sealing ring.

It is also possible to lead liquid through the piston and in particular to the region of the piston pin bearing so as to ensure cooling of the piston pin and bearing and the surrounding part of the piston.

Sealing arrangements are normally preloaded against the surface against which they are intended to seal. In pressurizing devises, such as compressors, this load is increased because of increased pressure resulting in increased friction and wear. According to the invention, the load against the cylinder surface may be limited and held relatively constant at a preset level, resulting in reduced wear and reduced friction.

Hereby a compressor, according to the invention, is less sensitive for surface smoothness and quality of the cylinder lining compared to previously known devices.

The invention is applicable in numerous applications. In particular the following markets are attractive for a lubricant free-compressor:
  breathing air for divers, fire brigades, hospitals etcetera
  Oxygen, wherein the minimal oil pollution means a risk of explosion and other gases, where oil and a lubricant is not permitted
  compressors for the manufacture of PET bottles and other products where even the smallest contamination of oil ruins the products
  industrial processes requiring absolutely pure air. For example electronics industry
  CO2 for the new generation of commercial washing machines using liquid CO2 as detergent.
  post mix apparatus for dispensing beverages
  filling of gases for the food industry, such as $CO_2$ for all bars, restaurants, breweries, protective gases for food production, food preservation, etcetera
  various applications related to the food ant the medical industry.

It is possible to have compressors oil-free. In case of an oil lubricated compressor, the number of sealing rings, which can be very high in background art devices can be reduced to only one. For several of the above applications, clean water is used as the liquid since this is tolerated in the compressed gas. It is already common practice to add a drying step after a compressor in order to obtain gas with reduced liquid/water contents. For instance, normal air mostly contains water that is condensed as the air is cooled down after compression and thereafter separated.

In other applications any other suitable liquid can be used after the demand in the particular field. The advantage with the invention is that the liquid mostly serves as a source of transferring the energy to balance the pressure on the seals and therefore diminishes the need for a high grade lubricant.

In this way a liquid can be used that does not chemically interfere or adsorbs by the pumped media.

A further alternative is to use the compressed medium in its liquid state as the supporting medium which is supplied to the second side of the sealing ring. This is applicable with respect of various media such as $CO_2$, water—steam, butane, propane, "natural liquid gases" etc. In these cases no contamination will occur.

In respect of sealing rings having an axially extending outside surface being applied against the meeting wall, according to the invention, virtually the same pressure will prevail on the entire side of the sealing ring directed from the meeting wall as a contrast to, as in the case with the previously known device, there is a pressure gradient between pressurizing chamber pressure and the much lower pressure along the axial extension of the outside surface of the sealing ring. This will ensure better pressure balance between the radial forces acting on the sealing ring.

Although the invention in particular has been described at the background of compressors, the invention is also applicable to all kinds of devices having relatively movable parts such as rotatable. In case of reciprocal piston devices, other piston pressurizers, piston engines such as steam-engines, other types of piston-cylinder motors scroll pumps etc. are within the range of the invention.

The invention claimed is:

1. A sealing arrangement for two relatively movable first and second parts, including a sealing ring positioned in a sealing ring seat formed as a groove in a circumference of one of the parts for sealing contact against the other one of the parts, so as to separate a first side of the sealing ring from a second side of the sealing ring, said sealing arrangement comprising:
  liquid supply means for supplying liquid under pressure to the second side of the sealing ring, and
  means for balancing a pressure of the supplied liquid in a region of the sealing ring so that forces on the sealing ring resulting from the pressure prevailing on the first side of the sealing ring are counteracted and balanced in such a way that in operation the sealing ring is essentially free-floating in the groove, said first and second parts being relatively reciprocating.

2. The arrangement according to claim 1, further comprising a valve device set to balance the pressure of the supplied liquid in the area of the sealing ring.

3. The arrangement according to claim 2, wherein the valve device is preset to limit the pressure of the supplied liquid.

4. The arrangement according to claim 3, wherein the valve device is set to limit the pressure to about 80-100% of the pressure inside the pressure chamber.

5. The arrangement according to claim 2, in that wherein the valve device includes a portion of the sealing ring in co-operation with the sealing ring seat.

6. The arrangement according to claim 5, in that wherein said portion of the sealing ring is a ring surface directed from the first side which is arranged to co-operate with a surface of said seat.

7. The arrangement according to claim 5, in that wherein said portion of the sealing ring is an edge portion or a separate sealing element directed radially from the element said portion is intended to seal against.

8. The arrangement according to claim 3, in that wherein the valve device is a pressure controlled valve which is separate from the sealing ring.

9. The arrangement according to claim 1, in further comprising a sealing device for sealing between the relatively movable parts in a position opposite to the sealing ring as seen from the position of the means for liquid supply.

10. The arrangement according to claim 9, wherein said sealing device is formed by a first, high pressure seal member and a second, low pressure seal, and an intermediate space having a fluid outlet.

11. The arrangement according to claim 10, wherein the fluid outlet is a low pressure outlet for eliminating pressure build-up in the intermediate space.

12. The arrangement according to claim 1, wherein at least one of the parts includes at least one outlet channel for supplied liquid.

13. A reciprocating piston device including a cylinder and a relatively movable piston and a sealing ring which is positioned in a seat formed as a groove in the circumference of one of the piston and the cylinder for sealing contact between the piston and the cylinder, so as to separate a first side of the sealing ring from a second side of the sealing ring, said piston and cylinder forming a pressure chamber, said piston device comprising:

liquid supply means for supplying liquid under pressure to the second side of the sealing ring, and means for balancing a pressure of the supplied liquid in a region of the sealing ring so that forces on the sealing ring resulting from the pressure prevailing on the first side of the sealing ring are counteracted and balanced in such a way that in operation the sealing ring is essentially free-floating in the groove.

14. The device according to claim 13, wherein the liquid supply means includes an enlarged piston portion for co-operation with an enlarged cylinder portion.

15. The device according to claim 14, wherein a working chamber which is formed by said piston and cylinder portions is ring-shaped.

16. The device according to claim 13, wherein the liquid supply means includes an external pump having at least one supply conduit debouching in a cylinder wall.

17. The device according to claim 16, wherein the liquid supply means includes a liquid pump selected from the group of a gear type pump, a reciprocating piston pump, an impeller pump, a screw pump or a rotary piston pump.

18. The device according to claim 13, wherein the piston includes a valve device which is preset to balance the liquid pressure in the area of the sealing ring.

19. The device according to claim 18, wherein the valve device is set to limit the pressure to about 80-100% of the pressure inside the pressure chamber.

20. The device according to claim 18, wherein the valve device includes a portion of the sealing ring in co-operation with its seat.

21. The device according to claim 20, wherein said portion of the sealing ring is a ring surface directed from the pressure chamber which is arranged to co-operate with a surface of said seat.

22. The device according to claim 20, wherein said portion of the sealing ring is an edge portion directed radially from the element said portion is intended to seal against.

23. The device according to claim 13, wherein the piston includes at least one outlet channel for liquid.

24. The device according to claim 13, wherein the valve device is a pressure controlled valve which is separate from the sealing ring.

25. The device according to claim 13, further comprising a sealing device for sealing between the piston and the cylinder in a position opposite to the sealing ring as seen from the position of liquid supply means.

26. The device according to claim 25, wherein said sealing device is formed by a first, high pressure seal member and a second, low pressure seal, and an intermediate space having a fluid outlet.

* * * * *